United States Patent [19]

McCoy

[11] 4,121,253
[45] Oct. 17, 1978

[54] VIDEO SPECIAL EFFECTS GENERATOR

[75] Inventor: Reginald F. H. McCoy, Gainesville, Fla.

[73] Assignee: Vital Industries, Inc., Gainesville, Fla.

[21] Appl. No.: 716,217

[22] Filed: Aug. 20, 1976

[51] Int. Cl.² .............................................. H04N 5/22
[52] U.S. Cl. .................................... 358/181; 358/182; 358/183; 358/185
[58] Field of Search ............... 358/182, 183, 185, 181; 340/324 AD

[56] References Cited

U.S. PATENT DOCUMENTS 3,728,479    4/1973    Srinivasan ............................ 358/183

*Primary Examiner*—Robert L. Griffin
*Assistant Examiner*—Edward L. Coles
*Attorney, Agent, or Firm*—Mason, Kolehmainen, Rathburn & Wyss

[57] ABSTRACT

An analog video special effects generator capable of producing unusual special effects such as a five-pointed star, a heart, a keyhole and a binocular shaped pattern in addition to standard patterns such as horizontal and vertical wipes. The special effects are achieved by utilizing ramp generators to generate bi-directional ramp signals and modulus circuits for taking the absolute values of the ramp signals in order to generate complex waveforms. Switching and combining circuits are utilized to combine the complex waveforms from various ones of the modulus circuits to generate the switching waveforms necessary to produce the unusual patterns.

25 Claims, 15 Drawing Figures

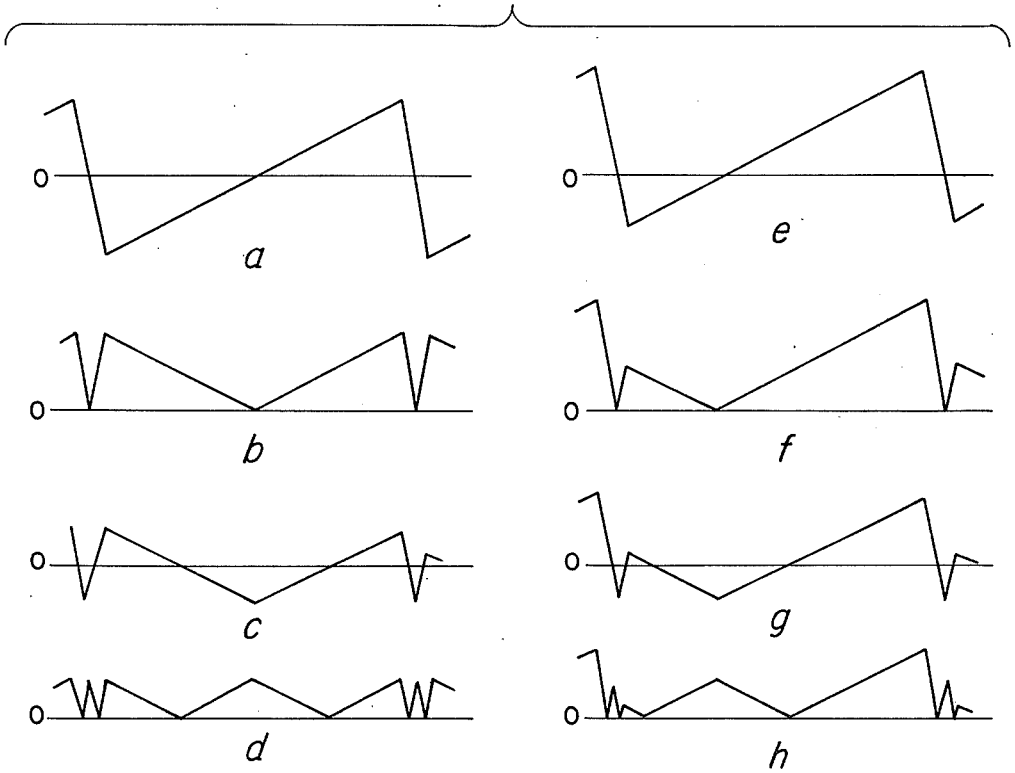
FIG. 2
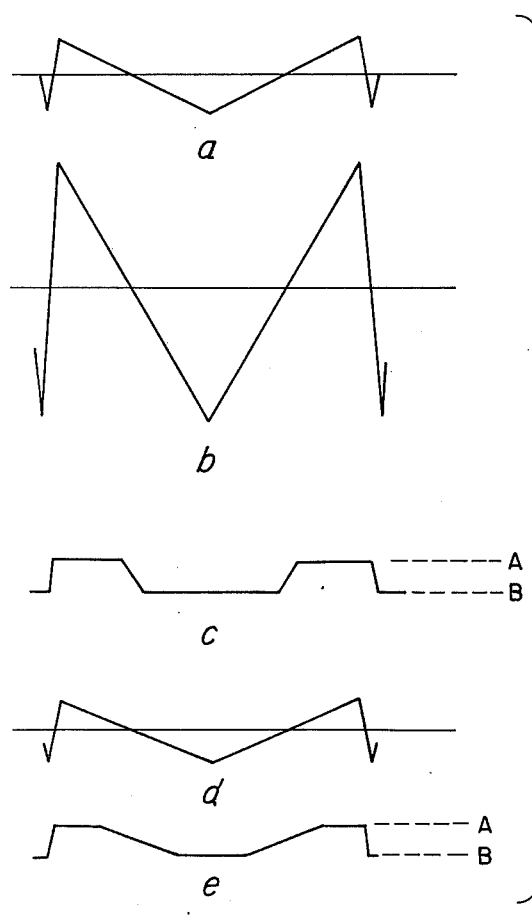
FIG. 3
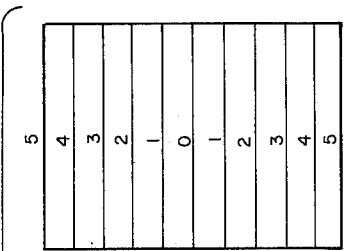
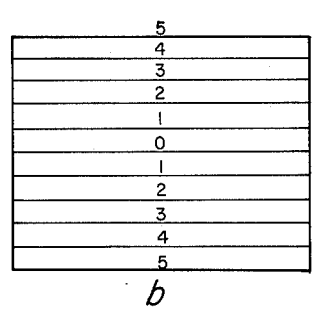
FIG. 4
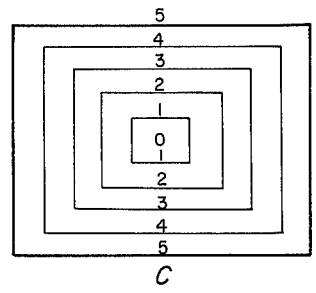

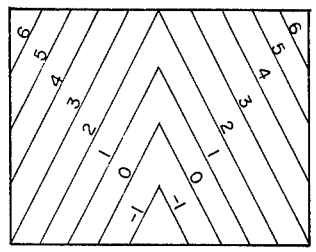
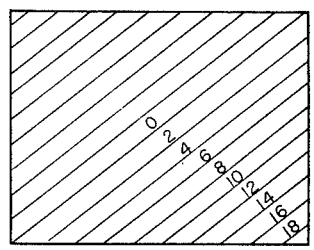
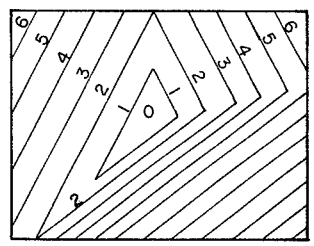
FIG. 5
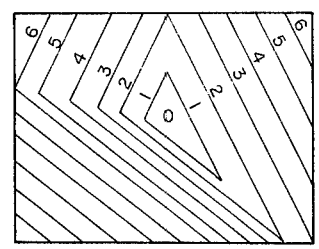
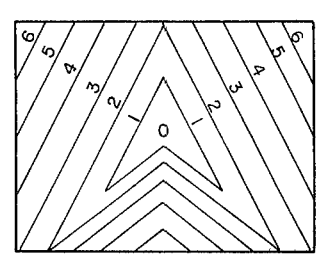
FIG. 6
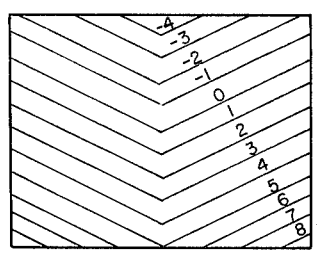
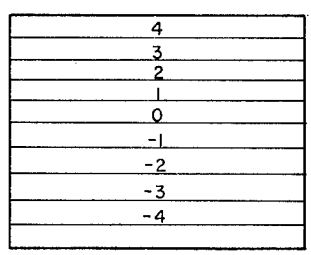
FIG. 7
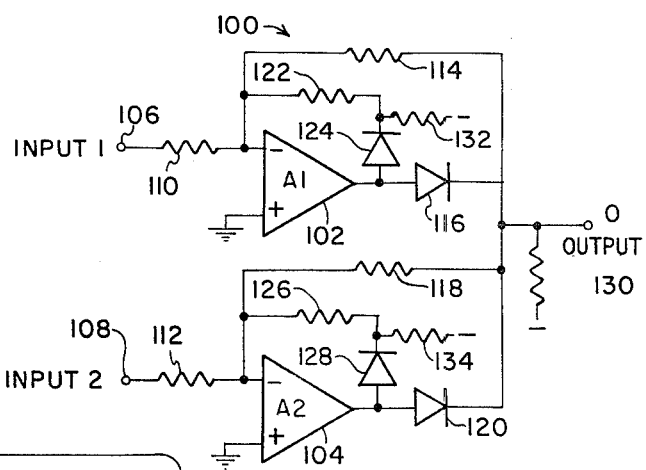
FIG. 8
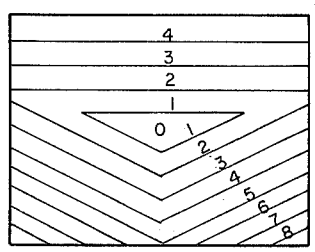
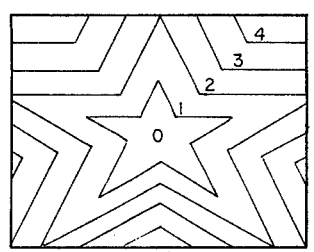

a        b a b

VIDEO SPECIAL EFFECTS GENERATOR

BACKGROUND OF THE INVENTION

This invention relates generally to special effects generators for television, and more particularly, to analog special effects generators capable of producing relatively complex patterns such as stars, hearts, keyhole, binocular and other patterns.

Special effects generators are well known, and can be divided into two general categories, namely, those utilizing analog circuitry to generate the special effects and those that utilize digital circuitry. Analog circuitry has heretofore been utilized in special effects generators that are capable of generating only relatively simple effects such as wipes wherein one image is wiped off of the screen by another, fades, wherein one image fades into another and inserts, wherein a square or rectangular portion of one video image is inserted into another video image. In order to avoid unduly complex circuitry, the inserts have been typically limited to square or rectangular inserts, and the wipes have been limited to horizontal or vertical wipes where the line separating the two images moves horizontally or vertically across the screen. More complicated rotational wipes such as "pinwheel" or "propeller" wipes are described in U.S. Pat. No. 3,812,286.

Because of the drift and periodic adjustment problems typically associated with analog circuitry, it has heretofore been advantageous to utilize digital circuitry when a special effects generator capable of producing complex effects was desired. Digital circuitry was used because analog circuitry required to produce complex special effects was rather complex, and the complex analog circuitry capable of producing such effects would require more maintenance and periodic adjustment than digital circuitry capable of providing the same function. A typical digital special effects generator is described in U.S. Pat. No. 3,821,468.

While the prior art analog special effects generators are useful in applications where only a limited number of special effects are desired, they are typically incapable of generating relatively complex patterns such as stars, hearts, keyholes, binocular patterns and other more intricate patterns such as triangles and V-shaped wipes. Digital special effects generators are capable of producing more complex patterns than typical analog special effects generators; however, digital special effects generators are considerably more complex than analog special effects generators, and therefore tend to be very costly.

SUMMARY OF THE INVENTION

Accordingly, it is an object of the present invention to provide a special effects generator that eliminates many of the problems associated with prior art special effects generators.

It is another object of the present invention to provide an analog special effects generator capable of producing complex special effects.

It is yet another object of the present invention to provide a relatively simple special effects generator capable of producing complex special effects.

In accordance with a preferred embodiment of the invention, generators are provided for generating ramp signals in synchronism with the horizontal and vertical synchronizing signals. The ramp signals are combined with respective horizontal and vertical DC control voltages and applied to horizontal and vertical modulus circuits which serve to generate signals proportional to the absolute magnitudes of the respective combined control and horizontal and vertical signals to generate more complex waveforms. In addition, horizontal and vertical multiple generators, which produce triangular waveforms having a repetition rate equal to an integral multiple of the respective horizontal and vertical scanning rates, are coupled to switching circuits and permit multiple patterns to be generated. The switching circuits serve to select and combine the outputs of the various generators and modulus circuits to generate the switching waveforms necessary to produce the desired patterns. In addition, multiplier and divider circuits are employed to operate on the combined waveforms to generate effects having nonlinear edges, and a variable gain amplifier is utilized to drive the video switch to provide a soft edge effect if desired.

DESCRIPTION OF THE DRAWINGS

These and other objects and advantages of the present invention will be better understood with the aid of the following specification and attached drawings wherein:

FIGS. 2 and 3 illustrate various waveforms occurring in the circuit illustrated in FIG. 1;

FIGS. 4–7 illustrate several special effects that can be generated by the special effects generator according to the invention;

FIG. 8 is a detailed circuit diagram of one of the combining circuits utilized in the special effects generator;

DETAILED DESCRIPTION OF THE PREFERRED EMBODIMENT

I. General

Figure 1:
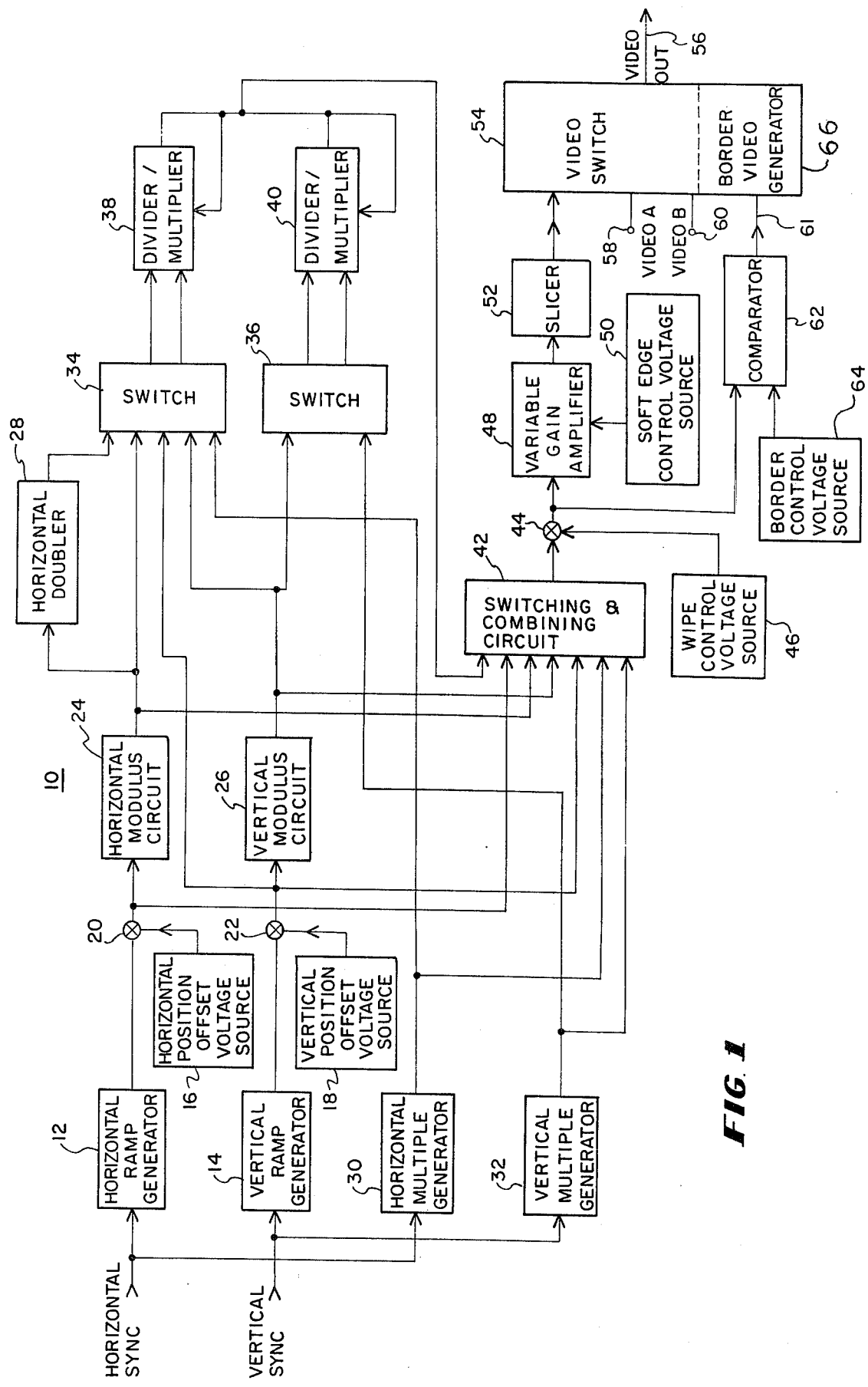
FIG. 1 is a general block diagram showing the video special effects generator according to the invention.

Referring now to the drawings, with particular attention to FIG. 1, an analog special effects generator according to the invention, generally designated by the reference numeral 10, comprises a horizontal ramp generator 12 and a vertical ramp generator 14. The horizontal ramp generator is connected to the source of horizontal synchronizing pulses (not shown) synchronizing the video signals to be switched, and the vertical ramp generator 14 is connected to a source of vertical synchronizing pulses (not shown) for the video to be switched. The horizontal ramp generator generates a sawtooth waveform at the horizontal scanning rate (e.g., approximately 15,750 Hz), and the vertical ramp generator 14 generates a sawtooth waveform at the vertical scanning rate which is typically much lower than the horizontal scanning rate (e.g., approximately 60 Hz). The outputs of the horizontal and vertical ramp generators are combined with DC voltages from respective horizontal and vertical voltage sources 16 and 18 by a pair of respective combining circuits 20 and 22. The outputs of the combining circuits 20 and 22 are applied to a pair of respective horizontal and vertical modulus circuits 24 and 26. The function of the horizontal and vertical modulus circuits 24 and 26 is to provide an output signal proportional to the magnitudes of the signals applied to the inputs of the modulus circuits, regardless of the polarity of the input signals. For example, each of the modulus circuits 24 and 26 may provide a positive one volt output signal when either a positive or a negative one volt signal is applied to its input. Similarly, if a positive or negative 2 volt signal is applied to the input, a positive 2 volt signal will appear at the output. In this manner, each of the modulus circuits provides an output signal representative of the absolute value or magnitude of the input signal, regardless of its sign. It should also be understood that in the illustrated example, each of the modulus circuits 24 and 26 provide an output signal equal in amplitude to the input signal; however, it should be noted that this need not be the case, and the magnitude of the output signal can be related to the magnitude of the input signal by any desired proportionally constant. A more detailed explanation of the operation of the modulus circuits 24 and 26 is given in a subsequent portion of the specification.

A horizontal doubler 28 which operates in a manner similar to the operation of the horizontal and vertical modulus circuits 24 and 26 is connected to the output of the horizontal modulus circuit 24 and serves to provide an output signal proportional to the magnitude of the output signal from the horizontal modulus circuit 28.

In addition to the horizontal and vertical ramp generators 12 and 14, a pair of horizontal and vertical multiple generators 30 and 32 are provided to permit multiple patterns to be generated. The horizontal multiple generator 30 is synchronized by the horizontal synchronizing pulses and provides a triangular waveform having an integral multiple of triangles (for example, seven) during each horizontal interval. In a similar manner, the vertical multiple generator 32 generates a triangular waveform having an integral multiple of triangles (for example, five) during each vertical interval.

The outputs of the horizontal doubler 28, the horizontal modulus circuit 24, the vertical modulus circuit 26 and the horizontal multiple generator 30 are connected to a switch 34. Similarly, the outputs of the vertical modulus circuit 26 and the vertical multiple generator 32 are connected to a switch 36 similar to the switch 34. The outputs of the switches 34 and 36 are connected to a pair of divider/multiplier circuits 38 and 40 and selectively apply one of the signals from the ramp generator, doubler, multiple generator and modulus circuits to each of the inputs of the divider/multiplier circuits 38 and 40. The outputs of the divider/multiplier circuits 38 and 40 are also combined and applied to a switching and combining circuit 42 which also receives signals from the combining circuit 20, the horizontal modulus circuit 24, the vertical modulus circuit 26, the combining circuit 22, the horizontal multiple generator 30 and the vertical multiple generator 32.

As will be described in a subsequent portion of the specification, the switching and combining circuit 42 selects and combines various ones of the signals applied thereto and provides them to a combining circuit 44 which also receives a wipe signal from a wipe controlled voltage source 46. The outputs of the switching and combining circuit 42 and the wipe controlled voltage source 46 are combined to provide a complex waveform which is applied to a variable gain amplifier 48. The gain of the variable gain amplifier 48 is controlled by a soft edge control voltage source 50 in order to vary the slope of the output voltage of the amplifier 48, and hence, the rate at which the transition is made between the first and second video signals to thereby achieve a soft edge effect when the transition is made slowly. The output of the variable gain amplifier 48 is applied to a slicer 52 which, in turn, drives a video switch 54. The video switch 54 is responsive to the signal from the slicer 52 and applies a signal to an output line 56 representative of the video signal applied to one of a pair of video inputs 58 and 60, or of a mixture of the video inputs 58 and 60, depending on the amplitude of the signal from the slicer 52. The slicer 52 serves to limit the maximum amplitude of the control voltage applied to the video switch 54.

The output of the combining circuit 44 is also applied to a comparator 62. The comparator 62 serves to compare the magnitude of the output voltage from the combining circuit 44 with the voltage received from a border control voltage source 64, and applies a control signal to a border video generator 66 indicative of whether the signal from the combining circuit 44 or the signal from the border control voltage source 64 has the greater amplitude. The border video generator 66 is responsive to the control voltage from the comparator 62 and serves to generate a border video signal in response to the signal from the comparator 62. The border video signal from the border video generator 66 and the video from the video switch 54 are combined by a combining circuit 72 and applied to the video circuits of the television transmitter or to a video recorder or the like if desired.

II. Pattern Generation — Straight Line Patterns

The various effects that can be obtained utilizing the ramp generators, multiple generator and modulus and doubler circuits are illustrated in FIGS. 4–7. From the previous discussion, it is apparent that the point at which the transition between the two video signals (video A and video B) occurs is dependent on the switching level set by the variable gain amplifier 48, the slicer 52 and the video switch 54, and on the amplitude of the waveform from the combiner and switching circuit 42. The addition of a wipe control voltage from the wipe control voltage source 46 is equivalent to changing, by an equal and opposite amount, the switching voltage determined by the variable gain amplifier 48, the slicer 52 and the video switch 54.

Since the waveform from the switching and combining circuit 42 varies as a function of the horizontal and vertical position of the scanning beam, the point on the television screen at which this waveform causes the video switch 54 to switch between video A and video B signals can be plotted on rectangles (representing a television screen) similar to those shown in FIGS. 4–7 for various values of the voltage from the wipe control voltage source 46. This family of curves, known as constant voltage contours, will indicate the shape of the pattern that will be generated by various combinations of the outputs from the ramp generators, the multiple generators and the modulus and doubler circuits.

In FIG. 4, the rectangles represent the TV screen and the numbered lines are constant voltage contours corresponding to various voltage levels from the wipe control voltage source 46. The numerical values shown are given for purposes of illustration only, and do not necessarily represent voltage values equal to the numbers shown.

The constant voltage contours of the horizontal modulus waveform (FIG. 2b) are a series of vertical straight lines (FIG. 4a). The wiping action, as the wipe control voltage from the wipe control voltage source 46 is varied, can be determined from FIG. 4a. For example, when no additional wipe control voltage is applied to the horizontal modulus waveform, only one of the video signals, for example video A, is selected. In this case, proceeding from left to right across the screen illustrated in FIG. 4a, video A is displayed until the zero voltage contour is reached. At this point, switching would normally occur from video A to video B as the horizontal modulus waveform (FIG. 2b) crosses the horizontal axis; however, since the slope of the horizontal modulus waveform (FIG. 2b) reverses before the horizontal axis is crossed, the switching does not occur and the video A signal is continuously displayed throughout the sweep.

If the wipe control voltage is offset by 1 volt so that the combined waveform will cross the horizontal axis as shown in FIG. 2c, the video A signal will be displayed as the scan travels from left to right until the 1 volt contour line is reached. At this point, switching will occur and video B will be displayed, and will continue to be displayed on the screen in the range between the two one volt contour lines (FIG. 4a). Video A will be displayed to the right of the rightmost 1 volt contour line. As the amount of wipe control voltage offset is increased, the width of the video B display will be increased (e.g., to the 2 volt, 3 volt and 4 volt contour lines) as the offset voltage is correspondingly increased. Finally, when the offset voltage is increased to correspond to the 5 volt contour line the width of the video B display will be increased enough that the video B display will occupy the entire screen.

FIG. 4b is a similar drawing of constant voltage contour lines for the waveform of the vertical modulus circuit. In this instance, the constant voltage contours are horizontal straight lines rather than vertical straight lines, and a wipe would begin as a narrow horizontal area of the video B signal at the center of the screen that gradually widens until the entire screen is occupied by the video B signal.

If the outputs of the horizontal and vertical modulus circuits 24 and 26 are combined in a combining amplifier that compares the amplitudes of the two waveforms and provides an output proportional to the larger (or smaller) of the two waveforms, a display of the type illustrated in FIG. 4c will result. Here, the second video signal (e.g., video B) will initially be displayed as a small rectangle in the center of the screen that gradually increases until the entire screen is occupied.

Other effects may be obtained by mixing the output signals from the various ramp and multiplier generators and from the various modulus and doubler circuits in varying proportions. For example, FIG. 5a shows the contours produced by mixing the waveform from the horizontal modulus circuit 24 with an inverted waveform from the vertical ramp generator 14 to produce a spear effect. Mixing the signals from the horizontal and vertical ramp generators 12 and 14 generates a diagonal separation line between the two video signals (FIG. 4b). Such a separation line would be useful when a diagonal wipe is required. By combining the waveforms producing the effects illustrated in FIGS. 5a and 5b in a combining circuit that provides a signal proportional to the largest of its input signals, an asymetrical triangle effect (FIG. 5c) is produced. If the horizontal ramp component were inverted, the resulting pattern would be a mirror image of FIG. 5c as shown in FIG. 6a. If the waveforms producing FIG. 5c and FIG. 6a were combined in a circuit that produces a signal proportional to the lesser (more negative) of the input signals, an arrowhead shape as illustrated in FIG. 6b would result.

If the waveform from the horizontal modulus circuit 24 and a waveform from the vertical ramp generator 14 (non-inverted with a different amplitude than the one used in FIG. 5a) were combined, the contours illustrated in FIG. 7a would result. An inverted vertical ramp would generate the contours shown in FIG. 7b, and combining the waveforms producing FIGS. 7a and 7b in a circuit providing an output signal proportional to the larger of the two input signals would generate a triangular border separating the two video signals (FIG. 7c). If the waveform providing the triangle of FIG. 7c is combined with the waveform providing the arrowhead of FIG. 6b in a circuit which provides an output signal proportional to the more negative of the two input signals, a five-pointed star as shown in FIG. 7d would result.

Similar approaches, employing circuits which provide signals proportional to either the greater or the lesser of a pair of input waveforms can be employed to generate a wide variety of patterns by combining simple input waveforms.

The functioning of the circuits illustrated in FIG. 1 can more readily be understood by referring to the waveforms shown in FIG. 2. FIG. 2a shows the output of the horizontal and vertical ramp generators 12 and 14. The output waveforms of the generators 12 and 14 have similar shapes, as indicated in FIG. 2a; however, the frequencies of the ramps generated by the horizontal and vertical ramp generators are different, with the frequency of the waveform produced by the horizontal ramp generator being, for example, approximately 15,750 Hz, and the frequency of the waveform generated by the vertical ramp generator 14 being, for example, only approximately 60 Hz.

The operation of the horizontal and vertical modulus circuits 24 and 26 is illustrated in FIG. 2b. Each of the modulus circuits receives a ramp signal from one of the respective horizontal and vertical ramp generators 12 and 14 and generates an output signal proportional to the amplitude of the ramp signal, regardless of its signal to generate a waveform similar to the waveform shown in FIG. 2b.

If the waveform shown in FIG. 2b is recentered, for example, by adding a direct current voltage to shift the level in the desired direction or by being passed through a capacitor to remove the DC component, a waveform similar to that shown in FIG. 2c will result. When this waveform is applied to the horizontal doubler circuit 28, which operates in a manner similar to the operation of the modulus circuits 24 and 26, the negative portions of the waveforms of FIG. 2c will be inverted to provide a waveform similar to the one shown in FIG. 2d. It should be noted that in the area between the retrace portions (i.e., the steep portions) of the ramp signals, the output of the modulus circuit (FIG. 2c) contains a single cycle of a triangular wave where the voltage starts at a given value, decreases to zero, and returns to its original starting value. The waveform of FIG. 2d contains two such cycles, and hence, the device 28 is referred to as a doubler.

The waveforms of FIGS. 2a–2d illustrate the operation of the modulus and doubler circuits without considering the effects of the DC voltages provided by the horizontal and vertical position of said voltage sources 16 and 18. The effect of these voltages is to change the average DC level of the signals applied to the modulus circuits 24 and 26, and hence, the point at which the ramp signals from the horizontal and vertical ramp generators 12 and 14 cross the zero axis. For example, if a positive voltage is applied to the combining circuit 20, the resulting waveform applied to the horizontal modulus circuit 24 will have an average DC value that is somewhat higher than the average DC value of the waveform shown in FIG. 2a, and hence, the ramp will cross the zero voltage point earlier than the ramp illustrated in FIG. 2a (see FIG. 2e). This causes a significant change to occur in the shapes of the waveforms provided by the modulus circuits 24 and 26 and the doubler circuit 28. If the waveform shown in FIG. 2e is applied to one of the modulus circuits, the output of the modulus circuit will be as shown in FIG. 2f. Since the modulus circuits merely invert the negative portions of the signals applied thereto, the resultant waveform will be nonsymmetrical. If the output waveform shown in FIG. 2f is again recentered about the zero voltage axis (eg., passed through a capacitor) and applied to the horizontal doubler circuit 28, and the nonsymmetrical waveform shown in FIG. 2h would result.

The waveforms shown in FIG. 2 can be combined in various proportions to provide a variety of complex effects. If these waveforms are linearly combined, the resultant effect will have straight lines separating the two video images. If these waveforms are applied to one of the divider/multipliers 38 and 40, curved lines separating the two video images can be obtained.

Besides the effects obtainable by the waveforms shown in FIG. 2, additional effects can be obtained by comparing the outputs of the horizontal and vertical multiple generators 30 and 32 with the waveform illustrated in FIG. 2. The general shape of the output waveforms from the horizontal and vertical multiple generators is similar to the waveform illustrated in FIG. 2c, except that more than one triangle will be produced during the scanning interval. As in the case of the horizontal and vertical ramp generators 12 and 14, the shape of the output waveforms from the horizontal and vertical multiple generators 30 and 32 are similar, the only difference being frequency, with the frequency of the output waveform from the horizontal multiple generator being much greater than the frequency of the waveform supplied by the vertical multiple generator The outputs of any of the waveform generators can be used to drive a variable gain amplifier to provide a soft edge effect. For example, as shown in FIG. 1, the output of the vertical modulus circuit 26 can be combined with the DC output of the source 46 in the proper magnitude relationship to center the vertical modulus signal about the zero axis (FIG. 3a). When this waveform is applied to a variable gain amplifier such as the amplifier 48 (via the switching and combining circuit 42 and the combining circuit 44) the output of the variable gain amplifier will be a waveform having essentially the same wave shape as the waveform provided by the vertical modulus circuit 26, however, the amplitude of the waveform will vary over a range determined by the voltage supplied by the soft edge control voltage source 50. A typical high amplitude output waveform will be similar to the waveform shown in FIG. 3b, and a typical low amplitude waveform will be similar to the waveform shown in FIG. 3d. The important difference between the waveforms of FIGS. 3b and 3d is the slope of the waveform between the retrace pulses.

The switching waveforms from the variable gain amplifier 48 are applied (via a slicer 52) to a video switch 54 such as, for example, the mix effects video unit utilized in the VIX-114 video switcher manufactured by Vital Industries, Inc. of Gainesville, Fla. When the waveforms shown in FIGS. 3b and 3d are applied to the slicer 52, which prevents excessively high voltages from being applied to the video switch 54, the waveforms illustrated in FIGS. 3c and 3e, respectively, will result.

The video switch 54 has a video output 56 and video A and video B inputs 58 and 60, respectively and a switching characteristic such that when the voltage from the slicer 52 approaches level A in FIGS. 3c and 3e, video A will be displayed, and when the voltage approaches level B, video B will be displayed. If the waveform shown in FIG. 3c, which has steep slopes in the transition region between levels A and B, is used as the control voltage for the video switch 54, the transition between video A and video B will be rapid, and narrow lines will separate the two video signals. If the gain of the amplifier 48 is reduced so that a waveform having shallow slopes between levels A and B (FIG. 3e) is used to control the video switch 54, the transition between the two video signals will be gradual, and a soft edge effect will occur between the two video signals. Similar soft edge effects for various patterns may be achieved by applying different waveforms from the switching and combining circuit 42 to the variable gain amplifier 48.

The output of the circuit 44 is also applied to a comparator 62 and compared with a direct current voltage from the border control voltage source 64. The output of the comparator 62 is a switching waveform having steep slopes (as in FIG. 3c). The comparator 62 compares the amplitude of the time varying voltage from the adding circuit 44 with the amplitude of the direct current voltage from the source 64, and provides an output transition when the time varying voltage crosses the level of the direct current voltage. The transition point of the output signal from the comparator 62 is altered by varying the magnitude of the direct current voltage supplied by the source 64. In this manner, the switching voltage from the comparator 62 is offset in time with respect to the switching waveform supplied by the slicer 52, and a border video signal may be switched into the pattern during the time interval between the transitions of the two switching signals to provide a border between the two video signals.

The border video signal is generated by a border video generator 68 forming part of the video switch 54. An example of a border video generator is the border video generator included in the previously referenced VIX-114 special effects generator. The border video generator 68 is controlled by the signal from the comparator 62 applied to an input 66 of the video switch 54. The input on the line 66 causes either the video A or the border video signal to be selected. Hence, by having the transition in the output signal from the comparator 62 occur slightly before the transition in the output of the slicer 52, a border video signal is applied to the output 56 shortly before the transition to the video B signal occurs. When the transition in the signal from the slicer 52 occurs, the video B signal is selected, and the video A and video B signals are separated by the border video generated by the border video generator 68.

III. Combining Circuits

As discussed previously, the generation of several of the patterns illustrated in FIGS. 4–7 requires that two waveforms be compared, and the greater (or lesser) of the two waveforms be selected to provide a resultant waveform. This function can be performed with diodes, but the use of diodes results in problems because the forward voltage drop across a diode varies between diodes and is temperature dependent, and because the switching action of diodes is normally too slow.

The forward voltage drop of the diodes results in an error in the power at which the circuit switches between the two video input signals, thereby resulting in a distortion of the pattern that is particularly objectionable when a complex pattern, such as the five-pointed star described above, is being generated. The offset cannot readily be compensated because the offset varies between diodes, and the distortion caused by the offset becomes even more objectionable when several circuits are cascaded because the offset errors of such cascaded circuits are added together, thereby compounding the problem.

The slow switching time will result in a mixing of the two inputs instead of an abrupt switching to the more positive (or more negative) signal. The effect of the slow switching on pattern generation is that where an abrupt change between inputs should occur, such as at a corner of a pattern, a more gradual transition actually occurs, thereby resulting in a rounding of the corners of the pattern. Similar problems arise if transistors are employed in place of diodes to perform the combining function.

An improved combining circuit 100 (FIG. 8) utilized in the present embodiment, avoids these problems by utilizing a pair of amplifiers each employing negative feedback to provide rapid switching action, and to stabilize the electrical characteristics of the switch. The combining circuit 100 illustrated in FIG. 8 utilizes a pair of high gain differential amplifiers 102 and 104. The inverting inputs of the amplifiers 102 and 104 are connected to a pair of input terminals 106 and 108 through a pair of respective resistors 110 and 112. The noninverting inputs of the amplifiers 102 and 104 are connected to a virtual ground. The virtual ground is shown as a direct ground connection in FIG. 8; however, in a practical circuit, a biasing network would most likely be connected to the noninverting inputs. The direct ground connection shown in FIG. 8 is shown for purposes of clarity, and is intended to indicate that the noninverting inputs are effectively grounded with respect to signal currents.

The amplifier 102 has a first feedback loop comprising a resistor 114 and a diode 116, and the amplifier 104 has a similar feedback loop comprising a resistor 118 and a diode 120. A second feedback loop comprising a resistor 122 and a diode 124 is provided around the amplifier 102, and a similar second feedback loop comprising a resistor 126 and a diode 128 is provided around the amplifier 104.

In order to simplify the discussion of the circuit shown in FIG. 8, the operation of the circuit will first be explained neglecting the effects of the second feedback loops. If, for purposes of discussion, we assume that the signal applied to the terminal 106 is more negative than the signal applied to the terminal 108, the output of the amplifier 102 will be greater than the output of the amplifier 104. This will cause the diode 116 to be conductive, thereby closing the first feedback loop around the amplifier 102. The diode 120 will be reverse biased, thereby opening the feedback loop around the amplifier 104.

Each of the amplifiers 102 and 104 is a very high gain amplifier that requires only a very small input current at either of its inputs to generate an output signal. Consequently, when the feedback loop is closed, in order to maintain the input current into the inverting input very small, the current flowing through the input resistor 110 (or 112) must be approximately equal and opposite to the current flowing through the feedback resistor 114 (or 116). Because of the negative feedback, when the feedback loop is closed, the output voltage of the amplifier 102 (or 104) is automatically adjusted to make the magnitude of the current flowing through the feedback resistor 114 (or 118) approximately equal to the magnitude of the current flowing through the input resistor 110 (or 112). If the current flowing through the input resistor 110 (or 112) is greater than the current flowing through the feedback resistor 114 (or 118), the output voltage of the amplifier 102 (or 104) will drop, thereby making the output voltage more negative with respect to the voltage present at the inverting terminal, and increase the current flowing through the resistor 114 (or 118). The voltage drop across the diode 116 (or 120) will not affect the output voltage at the junction of the diode 116 (or 120) and the resistor 114 (or 118), since when the feedback loop is closed, the output voltage of the amplifier 102 (or 104) will change to compensate for any change in the voltage across the diode 116 (or 120) in order to maintain the current through the resistor 114 (or 118) substantially equal to the current flowing through the resistor 110 (or 112). As a result, the output voltage of the circuit 100 remains very stable.

As previously stated, if the voltage applied to the input terminal 108 is greater than the voltage applied to the input terminal 106, the diode 120 will be reverse biased and the feedback loop around the amplifier 104 will be open. As a result, there will be a net positive flow of current into the inverting terminal of the amplifier 104 that would (absent the action of the feedback loop comprising the resistor 126 and the diode 128) drive the amplifier 104 into a saturated condition, and maintain the diode 120 in a nonconductive state. If the voltage applied to the input terminal 108 is now reduced relative to the voltage at the input terminal 106, at the point where the input voltages become equal, there will be substantially zero net current flowing into the inverting input terminal of the amplifier 104. A very small further decrease in the voltage applied to the terminal 108 will result in the output of the amplfier 104 going positive. This will render the diode 120 conductive, and result in current flow from the amplifier 104 through the diode 120 and into the inverting input of the amplifiers 102 and 104 through the respective feedback resistors 114 and 118. The increased current from the diode 120 flowing through the resistor 114 will result in a net positive current flow into the inverting input of the amplifier 102, and cause the output of the amplifier 102 to go relatively negative and cut off the diode 116. Thus, a very sharp switching action is obtained. A very small change in input voltage, beginning at the point where the two input voltages are equal, rapidly causes one diode to conduct and the other to be driven well into cutoff.

One of the problems with the circuit 100, absent the second feedback loops (resistor 122, diode 124 and resistor 126, diode 128) is that the amplifiers 102 and 104 are driven into saturation when a net positive current flows into their inverting terminals. Recovery from the saturated state normally involves a delay which results in a delay of the transition between one signal and the other. The second feedback loops have been installed to alleviate this problem.

The action of the circuit 100 with the addition of the second feedback circuits is similar to that described above, except that the amplifier with the more positive input is not driven into saturation, but is maintained in its linear region by feedback through the additional feedback path. In addition, when the two input signals have equal amplitudes and the net current into each amplifier input is substantially zero, the output of the amplifiers will be maintained at a positive voltage equal to the voltage drop across the respective diode 124 or 128. A slight increase in the voltage at the output of either amplifier resulting from a slight change in input voltage would then cause the respective diode 116 or 120 immediately to conduct. As a result, the diode 116 or 120 is driven into conduction faster than would be the case absent the second feedback loop wherein the voltage from the respective amplifiers 102 and 104 would have to increase from zero volts before the appropriate diode 116 or 120 would conduct. Finally, three resistors 130, 132 and 134 are each connected to a source of negative potential and to at least one of the diodes, and serve to maintain the diodes slightly conductive to further increase the speed at which the diodes become conductive.

Figure 9:
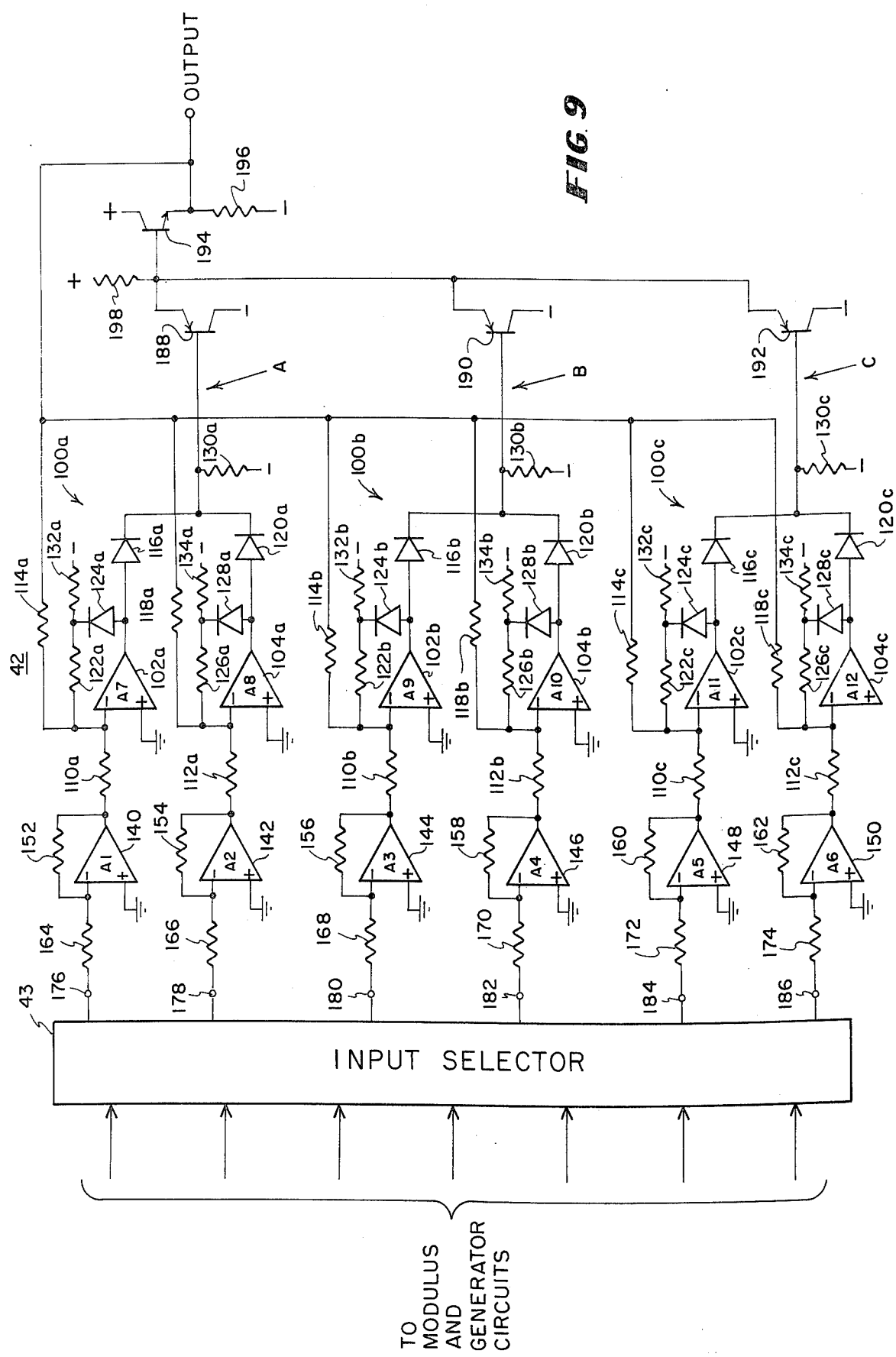
FIG. 9 is a combined block and schematic diagram of a switching and combining circuit usable in the circuit illustrated in FIG. 1.

The circuit illustrated in FIG. 9 may be used as the horizontal modulus circuit 24, the vertical modulus circuit 26 and the horizontal doubler 30. This can be done by simply placing an inverter in one of the inputs to the circuit 100 and feeding the other input of the circuit 100 as well as the input to the inverter with the same signal. For example, if the output of the inverter (now shown) is connected to the input 108, and if the horizontal ramp signal from the horizontal ramp generator 12 is applied to the input 106 as well as the input of the inverter, the circuit 100 will select the larger of the inverted and noninverted signals to generate a horizontal modulus waveform. The vertical modulus circuit would be similar, with the exception that the vertical ramp signal and the output of the horizontal modulus circuit, respectively, would be applied to the inputs of the inverter and the circuit 100.

Several of the circuits 100 may be utilized to combine various waveforms to provide different effects. A circuit utilizing three of the combining circuits 100 and an input selector switch 43 (FIG. 9) may be used as the switching and combining circuit 42 (FIG. 2). In the circuit of FIG. 9, three circuits similar to the circuit 100 of FIG. 8 are designated by the reference numbers 100a, 100b and 100c are connected to the input selector 43 which may comprise one or more integrated circuit data selector chips such as, for example, the Intersil IH5009 analog switch. Similar circuits may be used as the switches 34 and 36. The combination of the input selector 43 and the circuits 100a, 100b and 100c serves to combine six selected input signals into a single output signal. The circuits 100a, 100b and 100c are each connected to inverting amplifiers 140, 142, 144, 146, 148 and 150 which in practice would form portions of other circuits of the pattern generator, but which are illustrated in FIG. 9 to facilitate the understanding of the circuit operation. Feedback around each of the respective amplifiers 140, 142, 144, 146, 148 and 150 is provided by six resistors 152, 154, 156, 158, 160 and 162, and six input resistors 164, 166, 168, 170, 172 and 174 are employed to connect each of the inverting amplifiers to one of the respective input terminals 176, 178, 180, 182, 184 and 186.

Each of the circuits 100a, 100b and 100c functions in the same manner as the circuit 100 of FIG. 8. However, because of the inversions provided by the respecting inverting amplifiers, it is the more positive of the signals applied to each associated pair of input terminals 176, 178; 180, 182; and 184, 186 that will be selected and appear at the output of the circuits 100a, 100b and 100c. With two inverting amplifiers being cascaded in each of the circuits 100a, 100b and 100c, the signal appearing at the output of each of the circuits 100a, 100b and 100c will have the same polarity as the input signals to the inverting amplifiers 140, 142, 144, 146, 148 and 150.

The outputs of the circuits 100a, 100b and 100c are applied to the bases of three respective PNP transistors 188, 190 and 192. Whichever of the transistors 188, 190 and 192 has the most negative voltage applied to its base will conduct, and the other two transistors will be cut off. Consequently, the most negative output signal from the circuits 100a, 100b and 100c will be selected by the transistors 188, 190 and 192 and applied to the base of an NPN transistor 194 which is connected as an emitter follower having an emitter transistor 196. A resistor 198 serves as an emitter resistor for the transistors 188, 190 and 192, and since the transistor 194 and the three transistors 188, 190 and 192 have complementary symmetry, the base to emitter voltage offset of the transistor 194 will cancel the base to emitter voltage of the conductive one of the transistors 188, 190 and 192.

It should be noted that the feedback for the amplifiers 102a, 104a, 102b, 104b, 102c and 104c is taken from the output of the transistor 196. Thus, since the transistors 188, 190, 192 and 194 are in the forward part of the feedback loop of the last-mentioned amplifiers, any DC offset produced by these transistors due to temperature differences or other variations will not appear at the output. The use of the feedback loop around the entire circuit from the output of the emitter of the transistor 194 to the circuits 100a, 100b and 100c in addition to the individual feedback loop around each of the circuits 100a, 100b and 100c assures that the output voltage is stabilized regardless of where in the total circuit drift may occur, and results in a much more stable overall circuit.

One of the important features of the present invention is the use of circuitry for combining simple waveforms in appropriate proportions to generate more complex waveforms to generate complex patterns. Accordingly, the process in which the more complex waveforms are generated will be discussed in detail below.

The sequence involved in generating the five-pointed star previously discussed will now be described in conjunction with the circuit of FIG. 9. The mixture of the horizontal modulus waveform and the inverted vertical ramp (shown in contour form in FIG. 5a) is applied to the input point 176. This combined waveform to be applied to point 176 may readily be generated by inverting the ramp signal from the vertical ramp generator 14 with an inverting amplifier similar to the inverting amplifier 140 and applying the inverted vertical ramp signal to a resistive combining circuit (not shown) together with the output from the horizontal modulus circuit 24. The mixture of the signals from the horizontal and vertical ramp generators 12 and 14 may be obtained from a resistive combining circuit and applied to the input point 178. The combined output (shown in FIG. 5c) obtained by taking the more positive of the signals applied to the inputs 176 and 178 will appear at the output of the circuit 100a.

The waveform applied to the input 176 is also applied to the input 180, and a waveform similar to that applied to the input 178, but with the horizontal component inverted, is applied to the input 182. The combined output signal at the output of the circuit 100b will then correspond to the signal shown in contour form in FIG. 6a. The waveform shown in contour form in FIG. 7a is applied to the input 184, and the waveform shown in contour form in FIG. 7b is applied to the input 186. The output of the circuit 100c will then be a waveform which would produce the contour illustrated in FIG. 7c.

In the absence of the waveform provided by the circuit 100c, the output of the transistor 194, composed of the more negative of the signals provided by the circuits 100a and 100b would generate the contour shown in FIG. 6b. When the waveform provided by the circuit 100c is included in the comparison made by the transistor 194, the output of the transistor 194 consists of the most negative of the outputs of the circuits 100a, 100b and 100c, and results in a contour having the five-pointed star pattern shown in FIG. 7d.

IV. Pattern Generation — Curved Line Patterns

The previous description has described how special effects patterns with straight edges may be generated. A different approach is required for generating patterns with curved edges because of the nonlinear characteristics of the mathematical equation defining a circle.

Figure 10:
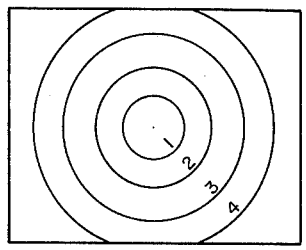
FIGS. 10 and 11 illustrate a circular special effects pattern.

The mathematical equation for a circle is $R = \sqrt{X^2 + Y^2}$. Therefore, if voltages proportional to the horizontal and vertical position of the scanning beam are separately squared and added, and the square root of the sum is taken, the result will be a waveform which (in contour form) will appear as a set of concentric, equally spaced circles as shown in FIG. 10. When the wipe control voltage from the wipe control voltage source 46 is varied, the resultant pattern will be an expanding or a contracting circle.

In the present embodiment, the signals from the horizontal and vertical ramp generators 12 and 14, which have an amplitude proportional to the respective horizontal and vertical position of the scanning beam, may be squared, summed and the square root taken. However, because the square of any quantity (other than an imaginery quantity) is always positive, regardless of the polarity of the quantity, the output of the horizontal and vertical modulus circuits 30 and 32 may be squared, instead, and the result of the squaring process would be the same as if the outputs of the horizontal and vertical ramp generators 12 and 14 were squared. However, the squaring of the outputs of the horizontal and vertical modulus circuits 24 and 26 has an advantage over the squaring of the outputs of the horizontal and vertical ramp generators 12 and 14. This is because the output of the horizontal and vertical modulus circuits 24 and 26 has only a single polarity (either positive or negative) and the squaring circuit need not be designed to accomodate both positive and negative input waveforms.

Figure 11:
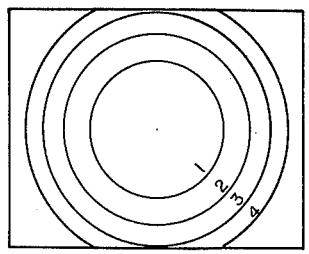

If only the squaring circuits were utilized and the square rooting function omitted, circular patterns would still be obtained, but the contours would be unequally spaced, as shown in FIG. 11. This would result in a nonlinear relation between the size of the pattern and the wipe control voltage, making the pattern difficult to control, particularly at small sizes where the pattern is very sensitive to small changes in wipe control voltage and to drift or noise superimposed on the wipe control voltage. It would also result in a variation of the width of the soft edge or border (when used) with pattern size. Furthermore, if the circle pattern is to be combined with linear patterns to form more complex patterns such as the keyhole pattern described below, it is necessary to include the square root function so that both patterns will respond in the same manner to variations in the wipe control voltage.

In accordance with an important aspect of the present invention, an improved circuit has been developed for generating the square root relation, $R = \sqrt{X^2 + Y^2}$. Previously known squaring circuits and square rooting circuits capable of generating such a relationship are not entirely satisfactory because of the large dynamic range that the square rooting circuit must accomodate. This is because the dynamic range that the square rooting circuit must accomodate is equal to the square of the dynamic range of the input signal. Even if a square rooting circuit having sufficient dynamic range were provided, the circuit would be very sensitive to noise or drift in DC level at the input since any noise or DC level would also be squared by the squaring circuit.

The improved circuit avoids the above-described problem by utilizing a recursive approach to solve the circle equation. Basically, the circuit solves the equation $(X \times X)/R + (Y \times Y)/R = R$. This equation is mathematically identical to the equation $R = \sqrt{X^2 + Y^2}$, but solving the recursive equation eliminates the need for a large dynamic range square rooting circuit, and thereby eliminates the problem associated with prior art circuits.

Figure 13:
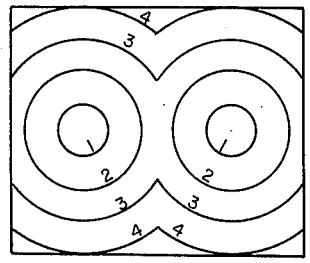
FIGS. 13–15 illustrate other special effects that can be obtained with the special effects generator according to the invention.
Figure 13:
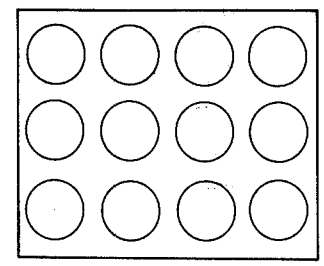

The circuit utilized to solve the recursive equation uses a pair of integrated divider/multiplier circuits such as the MC 1595 circuit manufactured by Motorola, Inc. (FIG. 13). The X input is first divided by R with a dividing circuit 202. The X signal (from the horizontal modulus circuit 24) is applied to the dividend input of the circuit 202 and the R signal which is fed back from the output is applied to the divisor input of the circuit 202. The output of the divider circuit 202 is then applied to a multiplier circuit 204 and multiplied by the X input. The resulting output from the circuit 204 is equivalent to the $(X \times X)/R$ portion of the recursive equation. Similarly, the Y input from the vertical modulus circuit 26 is applied to a second divider circuit 206 and divided by the output signal R. The output of the divider circuit 206 is then applied to a multiplier circuit 208 similar to the multiplier circuit 204 and multiplied by Y. The output of the multiplier circuit 204 is proportional to the $(Y \times Y)/R$ portion of the recursive equation. The outputs of the multipliers 204 and 206 are then summed to form the output R. The dynamic range of any part of the circuit 200 need be no more than the dynamic range of the inputs, and the circuit is no more sensitive to noise or drift than a linear amplifier having the same dynamic range.

Figure 12:
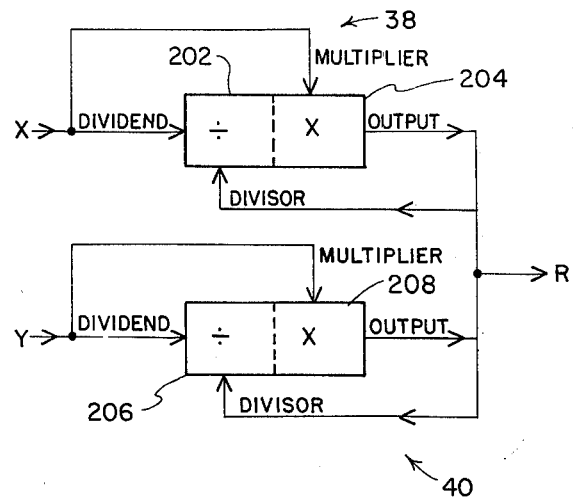
FIG. 12 is a block diagram of a divider/multiplier circuit usable in the circuit of FIG. 1 for generating circular patterns.

The circuit illustrated in FIG. 12 may be used to generate a variety of patterns. Since the opertion of the circuit is independent of frequency, multiple circles may be generated by feeding waveforms occurring at multiples of the horizontal or vertical rates into the inputs of the circuit 200. For example, by applying the waveform from the horizontal doubler circuit 28 (waveform of FIG. 2d) into the X input of the circuit 200 while applying the waveform from the vertical modulus circuit 26 into the Y input, a pair of circles or a binocular pattern (FIG. 13a) results. By using signals from the horizontal and vertical multiple circuits 30 and 32 as the X and Y inputs, a multiple circle pattern (FIG. 14b) is obtained.

Figure 14:
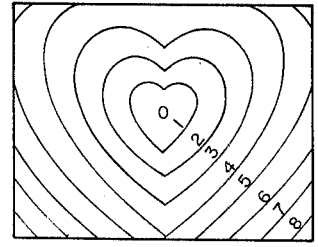

Further versatility is obtained by supplying different signals to the dividend and multiplier inputs of the divider 202, 206 and multiplier 204, 208 circuits. For example, by feeding the waveform from the horizontal modulus circuit 24 to the dividend input of horizontal divider 202, and a combination of waveforms from the horizontal modulus circuit 24 and the vertical ramp generator 14 to the multiplier input of the multiplier 204, while utilizing the same vertical modulus waveform as used in the generation of a circle to drive the vertical divider and multiplier 206 and 208, a heart shaped pattern as shown in FIG. 14 is obtained.

Figure 15:
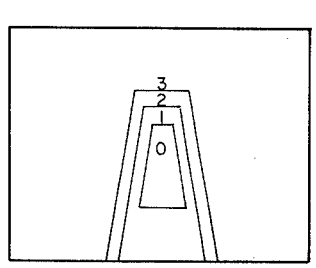
Figure 15:
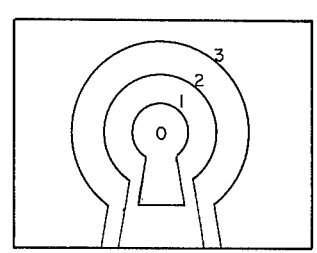

Several other possible patterns are obtainable by an appropriate choice of the input signals to the dividers 202, 206 and multipliers 204, 208, and in the system 10 (FIG. 10), switches 34 and 36 are provided to permit such a choice of input signals and patterns. The outputs of the divider/multiplier circuits 38 and 40 (FIG. 1) are applied to the switching and combining circuitry 42. This permits the waveform generated by the multiplier circuits 38 and 40 to be combined with the waveforms from the various modulus, multiplier and ramp generator circuits to permit the generation of patterns having both curved and linear sections. For example, appropriate input signals for generating a single circle pattern (FIG. 10) may be applied to the X and Y inputs of the divider/multiplier circuits 38 and 40, and the output of the divider/multiplier circuits 38 and 40 may be applied to the input 176 of the combining circuit (FIG. 9). A mixture of the waveform from the horizontal modulus circuit 24, an inverted waveform from the vertical ramp generator 14 (shown in contour form in FIG. 5a) and a mixture of the waveform from the vertical modulus generator 26 and an inverted waveform from the vertical ramp generator 14 may be fed into the input 182. The signal at the output of the combining circuit 100b resulting from these inputs will have a trapezoidal contour as shown in FIG. 15a. If no signals are applied to the input terminals 178, 184 and 186, the trapezoidal pattern (FIG. 15a) will be combined with the circle pattern (FIG. 10) by the transistors 188 and 190 (FIG. 9) to generate a signal having a keyhole shape contour pattern at the output of the transistor 194 (FIG. 15b).

The above examples illustrate the versatility of the present pattern generating system. The switching section of the switching and combining circuit 42 (FIG. 1) permits the selection of a wide variety of waveforms as inputs 176, 178, 180, 182, 184 and 186 of the combining circuits (FIG. 9). These waveforms may be waveforms from the horizontal and vertical ramp generators 12 and 14; waveforms from the horizontal and vertical modulus circuits 24 and 26, waveforms from the horizontal and vertical multiple generators 30 and 32, waveforms from the divider/multiplier circuits 38 and 40; or combinations of any of these waveforms. In addition to the patterns described, linear wipes, diagonal wipes, rectangles, diamonds, triangles, crosses, arrows, bars, serrated edge wipes and many other effects can be produced by appropriate switching of the input waveforms. In addition, any of the patterns may be repeated by using waveforms, such as the waveforms from the multiple generators 30 and 32, that repeat at multiples of the horizontal and vertical scanning intervals. Also, the use of the variable gain amplifier 48, the soft edge control voltage source 50, the border control voltage source 64 and the comparator 62 permit a soft edge or a border to be utilized in conjunction with any of the patterns generated.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A video special effects generator for generating a complex switching signal for controlling the combining of video input signals into a video output signal comprising:
    means for generating a time varying first switching signal which when used to control the switching of said video input signals is effective to produce a first predetermined video pattern;
    means for generating a time varying second switching signal which when used to control the switching of said video input signals is effective to produce a second predetermined video pattern; and
    means for combining said time varying first and second switching signals in predetermined proportions to provide said complex switching signal to provide a more complex video pattern.

2. A video special effects generator as recited in claim 1 wherein said first switching signal generating means includes means for producing a horizontal line video pattern and said second switching signal generating means includes means for producing a diagonal line video pattern, and said combining means includes means for combining said first and second switching signals in a predetermined manner to thereby provide a star-shaped video pattern upon the combination of said first and second switching signals.

3. A video special effects generator as recited in claim 1 wherein said first switching signal generating means includes means for producing a circular video pattern and said second signal generating means includes means for producing a trapezoidal video pattern and said combining means includes means for combining said first and second switching signals in a predetermined manner to provide a keyhole-shaped pattern upon the combination of said first and second patterns.

4. A video special effects generator for controlling the combining of video input signals into a video output signal, each of said video signals having a horizontal and vertical scanning rate, said generator comprising:
    means for generating a plurality of switching signals having a repetition rate equal to a predetermined multiple of one of said horizontal and vertical scanning rates;
    first and second divider circuits each having a divisor input, a dividend input and an output;
    first and second multiplier circuits each having a pair of inputs and an output;
    means for selectively applying one of said switching signals to each of said dividend inputs of said divider circuit and to one of the inputs of each of said multiplier circuits;

means for applying the output of said first divider circuit to the other input of said first multiplier circuit;

means for applying the output of said second divider circuit to the other input of said second multiplier circuit; and means for combining the outputs of said first and second multiplier circuits and for applying said combined output to the divisor inputs of said first and second divider circuits.

5. A video special effects generator as recited in claim 4 wherein said switching signal generating means includes means for generating a horizontal modulus waveform and for applying said horizontal modulus waveform to the dividend input of said first divider, means for generating a horizontal modulus waveform and a vertical ramp waveform and for combining said horizontal modulus and vertical ramp waveforms to provide a combined waveform for application to said one multiplier input of said first multiplier, and means for applying a vertical modulus waveform to the dividend input of said second divider and to said one input of said second multiplier, to thereby provide a heart-shaped video pattern under the control of said combined outputs of said multiplier circuits.

6. A video special effects generator for controlling the combining of video input signals into a video output signal, each of said video signals having a horizontal and a vertical scanning rate, said generator comprising:

means for generating a horizontal ramp signal having a repetition rate equal to the horizontal scanning rate of said video signals;

means for generating a vertical ramp signal having a repetition rate equal to the vertical scanning rate of said video signals;

means responsive to said horizontal ramp signal generating means for modifying the horizontal ramp signal by reversing the slope of a predetermined portion of the ramp signal and for providing a horizontal modulus signal representative of the modified horizontal ramp signal;

means responsive to said vertical ramp signal generating means for modifying said vertical ramp signal by reversing the slope of a predetermined portion of the vertical ramp signal and providing a vertical modulus signal representative of the modified vertical ramp signal; and means for combining predetermined ones of said horizontal and vertical ramp signals and said horizontal and vertical modulus signals thereby to generate a video switching signal for controlling the combining of the video input signals into the video output signal.

7. A video special effects generator as recited in claim 6 further including means for generating a horizontal multiple signal having a triangular waveform and a repetition rate equal to a multiple of the horizontal scanning rate, means for generating a vertical multiple signal having a triangular waveform and a repetition rate equal to a multiple of the vertical scanning rate, and means for selectively applying the horizontal and vertical multiple signals to said combining means for rendering said combining means operative to selectively combine said horizontal and vertical multiple signals with predetermined ones of said horizontal and vertical ramp and modulus signals.

8. A video special effects generator as recited in claim 6 wherein said combining means includes means responsive to the one of the signals applied thereto having the largest amplitude and for providing a signal proportional to said largest amplitude signal.

9. A video special effects generator as recited in claim 6 wherein said combining means includes means responsive to the most negative of the signals applied thereto for generating a video switching signal representative of said most negative signal.

10. A video special effects generator as recited in claim 6 further including means coupled to said combining means for varying the amplitude of said switching signal, said video switch having first and second video inputs and a video output and being responsive to said amplitude adjusting means for rapidly switching said video inputs into said video output when the amplitude of said switching signal is high, and for gradually switching said video inputs into said video outputs when the amplitude of said switching signal is reduced.

11. A video special effects generator as recited in claim 6 further including a multiplier circuit having a pair of inputs and an output, and a divider circuit having a dividend input, a divisor input and an output, said generator including means for coupling one of said ramp signals and one of said modulus signals to one input of each of the multiplier and divider circuits.

12. A video special effects generator as recited in claim 1 wherein said coupling means includes means for simultaneously applying a single one of said ramp and modulus signals to said dividend input of said divider circuit and to one of the inputs of said multiplier circuit, said special effects generator further including means for applying the output of said divider to the other input of said multiplier circuit and for coupling the output of said multiplier circuit to the divider input of said divider circuit.

13. A video special effects generator as recited in claim 6 further including first and second multiplier circuits each having a pair of inputs and an output, and first and second divider circuits each having a dividend input, a divisor input, and an output, said special effects generator including means for applying one of said ramp and modulus signals to one input of each of said multiplier and divider circuits.

14. A video special effects generator as recited in claim 13 wherein said applying means includes means for simultaneously applying a first single one of said ramp and modulus signals to the dividend input of said first divider circuit and to one of the inputs of said first multiplier circuit, means for simultaneously applying a different single one of said ramp and modulus signals to the dividend input of said second divider circuit and to one of the inputs of said second multiplier circuit, said special effects generator further including means for coupling the output of each of said divider circuits to the other input of the respective one of said multiplier circuits and for coupling the outputs of said multiplier circuits together and to the divisor input of each of said divider circuits.

15. A video special effects generator as recited in claim 14 further including means for combining the outputs of said multiplier circuits with signals from predetermined ones of said modulus signal and ramp signal generating means.

16. A video special effects generator as recited in claim 14 further including means responsive to said horizontal modulus circuit for reversing the slope of predetermined portions of said horizontal modulus signal thereby to provide a horizontal doubler signal, and means for applying said horizontal doubler signal to one of said divider circuits.

17. A video special effects generator for controlling the combining of video input signals into a video output signal, each of said video signals having a horizontal and a vertical scanning rate, said generator comprising:
means for generating a first signal having a repetition rate equal to a predetermined multiple of the horizontal scanning rate;
means for generating a second signal having a repetition rate equal to a predetermined multiple of the vertical scanning rate;
first and second divider circuits each having a divisor input, a dividend input and an output;
first and second multiplier circuits each having a pair of inputs and an output;
means for applying said first signal to the dividend input of said first divider circuit and to one of the inputs of said first multiplier circuit;
means for applying said second signal to the dividend input of said second divider circuit and to one of the inputs of said second multiplier circuit;
means coupling the output of said first divider circuit to the other input of said first multiplier circuit;
means coupling the output of said second divider circuit to the other input of said second multiplier circuit; and p1 means for combining the outputs of said first and second multiplier circuits and for applying said combined outputs to the divisor inputs of said first and second divider circuits.

18. A video special effects generator as recited in claim 17 wherein said first signal has an amplitude related to the horizontal coordinate of the scan, and said second signal has an amplitude related to the vertical coordinate of the scan.

19. A video special effects generator as recited in claim 18 wherein said first signal generating means includes means for generating a sawtooth waveform at the horizontal scanning rate, and said second signal generating means includes means for generating a sawtooth waveform at the vertical scanning rate.

20. A video special effects generator as recited in claim 18 wherein said first signal generating means includes a horizontal ramp generator, and said second signal generating means includes a vertical ramp generator.

21. A video special effects generator as recited in claim 20 wherein said first signal generating means includes a horizontal modulus circuit coupled to said horizontal ramp generator, and said second signal generating means includes a vertical modulus circuit coupled to said vertical ramp generator.

22. A video special effects generator as recited in claim 21 wherein said first signal generating means includes a horizontal doubler coupled to said horizontal modulus circuit.

23. A video special effects generator as recited in claim 18 further including means coupled to said first and second signal generating means and said combining means for selecting a predetermined one of said first and second signals and said combined signals to generate a video switching signal.

24. A video special effects generator as recited in claim 23 wherein said selecting means includes means for selecting the one of said first, second and combined signals having the highest amplitude.

25. A video special effects generator as recited in claim 23 wherein said selecting means includes means for selecting the one of said first, second and combined signals having the lowest amplitude.

* * * * *